(12) United States Patent
Minami

(10) Patent No.: US 12,466,313 B2
(45) Date of Patent: Nov. 11, 2025

(54) DRIVING ASSISTANCE DEVICE

(71) Applicant: TOYOTA JIDOSHA KABUSHIKI KAISHA, Toyota (JP)

(72) Inventor: Yui Minami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 18/430,812

(22) Filed: Feb. 2, 2024

(65) Prior Publication Data

US 2024/0262286 A1    Aug. 8, 2024

(30) Foreign Application Priority Data

Feb. 7, 2023   (JP) .................................. 2023-017113

(51) Int. Cl.

| | |
|---|---|
| *B60Q 1/00* | (2006.01) |
| *B60Q 3/10* | (2017.01) |
| *B60Q 3/217* | (2017.01) |
| *B60Q 3/70* | (2017.01) |
| *B60W 40/06* | (2012.01) |
| *B60W 40/08* | (2012.01) |
| *B60W 50/14* | (2020.01) |

(52) U.S. Cl.
CPC .............. *B60Q 3/70* (2017.02); *B60Q 3/10* (2017.02); *B60Q 3/217* (2017.02); *B60W 40/06* (2013.01); *B60W 40/08* (2013.01); *B60W 50/14* (2013.01); *B60W 2040/0818* (2013.01); *B60W 2050/143* (2013.01); *B60W 2050/146* (2013.01); *B60W 2540/225* (2020.02); *B60W 2540/229* (2020.02)

(58) Field of Classification Search
CPC . B60Q 3/70; B60Q 3/10; B60Q 3/217; B60Q 3/80; B60Q 9/00; B60W 40/06; B60W 40/08; B60W 50/14; B60W 2040/0818; B60W 2050/143; B60W 2050/146; B60W 2540/225; B60W 2540/229
USPC ............. 340/438, 439, 425.5, 457, 458, 461
See application file for complete search history.

(56) References Cited

U.S. PATENT DOCUMENTS

| | | | |
|---|---|---|---|
| 11,702,006 B2 * | 7/2023 | Fuwamoto | B60Q 3/78 340/439 |
| 2017/0259821 A1 | 9/2017 | Nakadori | |
| 2018/0086346 A1 * | 3/2018 | Fujisawa | B60Q 3/78 |
| 2020/0148098 A1 * | 5/2020 | Salter | B60Q 1/245 |
| 2021/0209922 A1 * | 7/2021 | Yang | B60W 60/0055 |
| 2021/0237743 A1 * | 8/2021 | Boström | B60W 40/08 |

FOREIGN PATENT DOCUMENTS

JP           2017-162052 A          9/2017

\* cited by examiner

*Primary Examiner* — Anh V La
(74) *Attorney, Agent, or Firm* — Dinsmore & Shohl LLP

(57) ABSTRACT

A driving assistance device for assisting driving of a driver of a vehicle includes: an in-vehicle light device for illuminating an inner surface of an interior of the vehicle; and a control device for controlling the in-vehicle light device. The control device includes: a condition determination unit for determining whether or not a forward facing condition in which the driver should face forward is satisfied; and a light control unit for controlling the in-vehicle light device so that light moves on an inner surface of the vehicle toward a position ahead of the driver when it is determined that the forward facing condition is satisfied.

5 Claims, 6 Drawing Sheets

DRIVING ASSISTANCE DEVICE

CROSS-REFERENCE TO RELATED APPLICATIONS

This application claims priority to Japanese Patent Application No. 2023-017113 filed Feb. 7, 2023, the entire contents of which are herein incorporated by reference.

FIELD

The present disclosure relates to a driving assistance device.

BACKGROUND

Conventionally, it is known to notify a driver of starting of a preceding vehicle by causing a combination meter to indicate the start of the preceding vehicle or outputting a notification sound when a host vehicle remains stopped, even though the preceding vehicle has started from a state in which the host vehicle and the preceding vehicle were both stopped (JP2017-162052A).

SUMMARY

In a case where it is necessary to urge the driver to face forward, such as in a case where the host vehicle remains stopped, even though the preceding vehicle has started, even if a notification of starting of the preceding vehicle is displayed on the combination meter, the driver may not be aware of the notification. In such a case, when the notification sound is output, the driver may feel discomfort.

In view of the above problems, it is an object of the present disclosure to provide a new method for prompting a driver to face forward.

The gist of the present disclosure is as follows.

(1) A driving assistance device for assisting driving of a driver of a vehicle, comprising: an in-vehicle light device for illuminating an inner surface of an interior of the vehicle; and, a control device for controlling the in-vehicle light device, wherein the control device includes: a condition determination unit for determining whether or not a forward facing condition in which the driver should face forward is satisfied; and a light control unit for controlling the in-vehicle light device so that light moves on an inner surface of the vehicle toward a position ahead of the driver when it is determined that the forward facing condition is satisfied.

(2) The driving assistance device according to above configuration (1), wherein when it is determined that the forward facing condition is satisfied, the light control unit controls the in-vehicle light device such that light moves from a rear side of the vehicle toward a front side of the vehicle on an inner surface of a side surface of the interior of the vehicle.

(3) The driving assistance device according to above configuration (1) or (2), wherein when it is determined that the forward facing condition is satisfied and the driver is not directed forward, the light control unit controls the in-vehicle light device so that light moves toward the position ahead of the driver on the inner surface of the vehicle.

(4) The driving assistance device according to above configuration (3), wherein the control device further includes a warning unit that causes a warning to be displayed on a display device of the vehicle or a sound representing a warning to be output, when it is determined that the driver is not directed forward, after controlling the in-vehicle light device so that light moves toward a position ahead of the driver on the inner surface of the vehicle.

(5) The driving assistance device according to any one of above configurations (1) to (4), wherein the forward facing condition is satisfied when at least one of a start of a preceding vehicle of the vehicle, a switching of a traffic signal in front of the vehicle from a stop indication to a passage permission indication, and a inattentiveness of the driver is detected.

DESCRIPTION OF EMBODIMENTS

Figure 1:
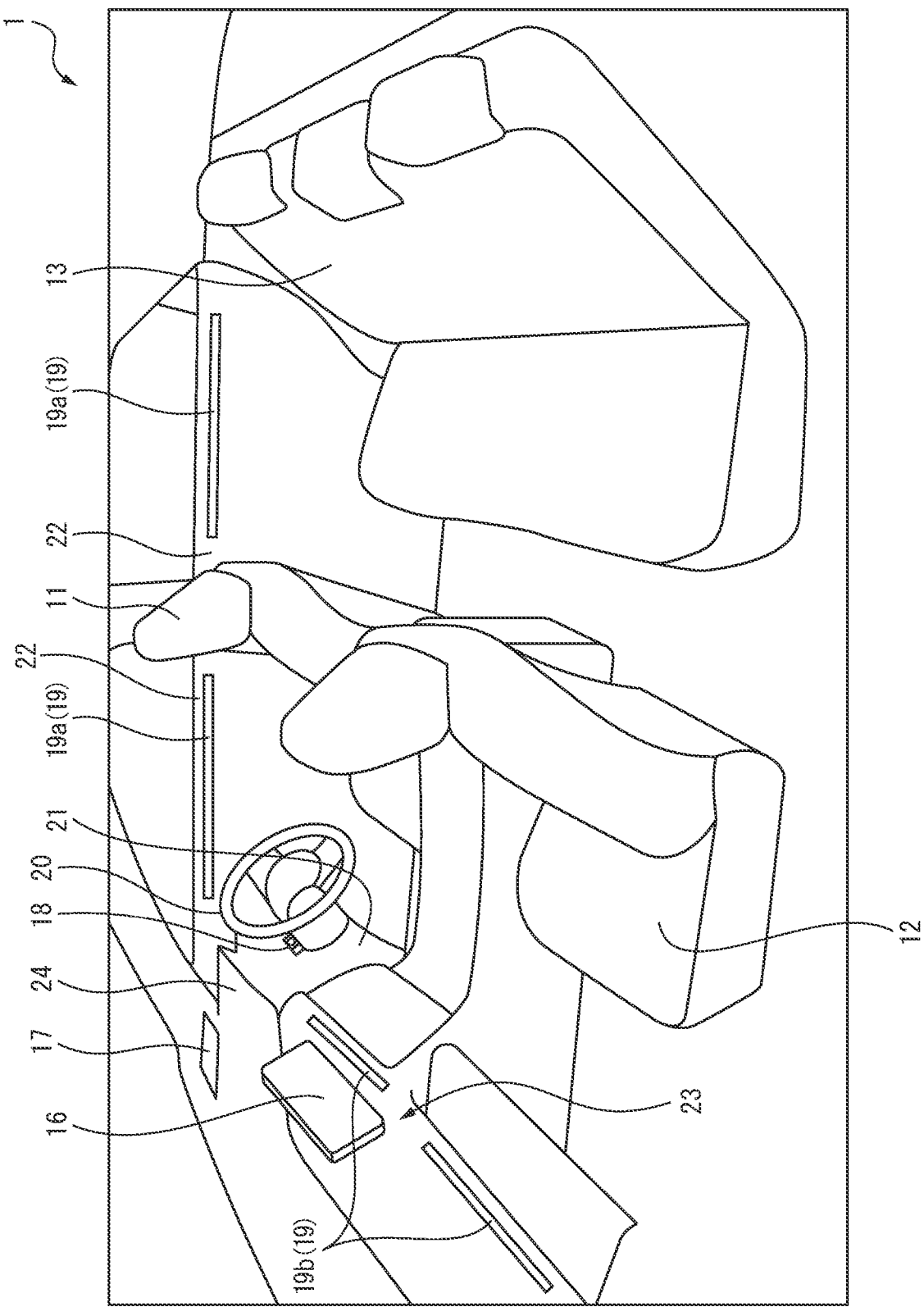
FIG. 1 is a diagram schematically illustrating an interior of a vehicle.

Hereinafter, embodiments will be described in detail with reference to the drawings. In the following description, the same reference numerals are given to the same components.

First Embodiment

Configuration of Vehicle

First, with reference to FIG. 1, a configuration of an interior of a vehicle 1 provided with a driving assistance device according to the present embodiment will be described. FIG. 1 is a diagram schematically illustrating an interior of the vehicle 1. The vehicle 1 may be a manual driving vehicle in which the driver manually controls the vehicle 1, or may be an automatic driving vehicle in which the vehicle 1 automatically controls the vehicle 1 at least in part.

As shown in FIG. 1, the vehicle 1 includes a driver seat 11 in which a driver is seated, and a passenger seat 12 and a rear seat 13 in which other passengers are seated. Further, the vehicle 1 includes a meter panel 15, a display 16, speakers 17, a driver monitor camera 18, and an embedded light 19.

The meter panel 15 is a device that displays information related to driving of the vehicle 1 (for example, speed of the vehicle 1, navigation information, and the like), and is an example of a display device that displays an image or the like. The meter panel 15 is disposed in front of the driver's seat 11 so as to be visible to the driver. In addition, a head-up display device (not shown) that displays information related to driving on a window glass in front of the driver's seat 11 may be provided in front of the driver's seat 11.

The display 16 is a device that displays an image by causing a screen to emit light, and is an example of a display device that displays an image or the like. The display 16 is positioned in front of the vehicle between the driver's seat 11 and the passenger seat 12 so that the driver and other occupants can view it. As the display 16, various displays such as a liquid crystal display and an organic EL display can be used. The display 16 may include a touch panel that can be touched and operated by an occupant. It should be noted that the display 16 may be provided elsewhere, as long as at least the driver can visually recognize it.

The speakers 17 are devices that output sound, and are disposed, for example, on both front sides of the interior of the vehicle 1 so as to output sound toward the driver and other occupants.

The driver monitor camera 18 is a capturing apparatus that captures an image of a driver, in particular, a face of the driver and a part of the upper body. In the present embodiment, the driver monitor camera 18 is provided at an upper part of the steering column 21 to which the steering wheel 20 is attached. The driver monitor camera 18 may be provided at a position different from the upper part of the steering column 21, as long as the driver of the vehicle 1 can be captured. For example, the driver monitor camera 18 may be provided in or on the steering wheel 20, a rearview mirror, the meter panel 15, a meter hood 24, or the like of the vehicle 1.

The driver monitor camera 18 includes a camera and a projector. For example, the camera is a CMOS (Complementary Metal-Oxide-Semiconductor) camera or a CCD (Charge-Coupled Device) camera, and the projector is a LED (Light Emitting Diode). In some embodiments, the projector is a near-infrared LED so that the driver's face can be captured without causing discomfort to the driver even at low illuminance, such as at night, and the camera is also capable of detecting near-infrared rays. For example, the projector may be two near-infrared LED located on either side of the camera. Further, the camera may be provided with a filter such as a visible light cut filter.

The driver monitor camera 18 captures an image of the driver at every predetermined capturing cycle and generates an image in which the driver is captured. The driver monitor camera 18 is connected to an ECU 40 via an in-vehicle network 35, which will be described later, and outputs the generated image to the ECU 40 each time the image is generated.

The embedded light 19 is an example of an in-vehicle optical device that illuminates an inner surface of the interior of the vehicle 1. In the present embodiment, the embedded light 19 is embedded in the inner surface of the interior of the vehicle 1 and extends linearly. In the embodiment shown in FIG. 1, the vehicle 1 is provided with two types of embedded lights 19a, 19b.

The first embedded light 19a is provided on a side surface of the interior of the vehicle 1. Specifically, in the present embodiment, the first embedded light 19a is disposed on the inner surface of the side door 22 of the vehicle 1 so as to extend in the front-rear direction of the vehicle 1. In particular, in the present embodiment, the first embedded light 19a is provided on the inner surface of the side door 22 of the driver's seat 11 or the passenger's seat 12 and the inner surface of the side door 22 of the rear seat 13. In particular, in the present embodiment, the first embedded light 19a extends linearly over the entire front-rear direction of the side door 22 of the driver's seat 11 or the passenger's seat 12. In addition, the first embedded light 19a extends linearly over the entire front-rear direction of the side door 22 of the rear seat 13. Although FIG. 1 shows a first embedded light 19a provided only on one side (the side surface on the driver's seat side) of the vehicle, the first embedded light 19a may also be provided on the opposing side.

On the other hand, the second embedded light 19b is provided on the front surface of the interior of the vehicle 1. Specifically, in the present embodiment, the second embedded light 19b is disposed on the inner surface of the instrument panel 23 (the panel provided with the meter panel 15, the display 16, the steering column 21, and the like) disposed in a front side of the interior of the vehicle 1 so as to extend in the left-right direction of the vehicle 1. In particular, in the present embodiment, the second embedded light 19b extends linearly in the left-right direction over the entire front of the passenger seat 12 and the entire front between the passenger seat 12 and the driver's seat 11.

In the present embodiment, the vehicle 1 is provided with two types of embedded lights: the first embedded light 19a and the second embedded light 19b. However, the vehicle 1 may be provided with only the first embedded light 19a or only the second embedded light 19b. Further, the first embedded light 19a may be provided only on the inner surface of the side door 22 of the driver's seat 11 or the passenger's seat 12, and may not be provided on the inner surface of the side door 22 of the rear seat 13. The first embedded light 19a may extend linearly over only a part of the front-rear direction of the side doors 22 of the driver's seat 11 and the rear seat 13. In addition, the second embedded light 19b may extend laterally only a part of in front of the passenger seat 12 and front of a part between the passenger seat 12 and the driver's seat 11.

The embedded light 19 is configured to emit light by itself, and is disposed so as to be visible to an occupant when the light is emitted. The embedded light 19 is composed of a plurality of lights that can independently control light emission and light extinguishing. In particular, in the present embodiment, the embedded light 19 includes a plurality of LED lights capable of emitting light by themselves. Therefore, in the linearly extending embedded light 19, only an arbitrary portion of the embedded light 19 can be caused to emit light at an arbitrary timing. Therefore, the embedded light 19 can control the light emission such that the illuminated light portion moves by sequentially emitting the light from one end portion toward the other end portion thereof. The embedded light 19 may be a light-emitting device other than a LED light, as long as it can emit light by itself.

Figure 2:
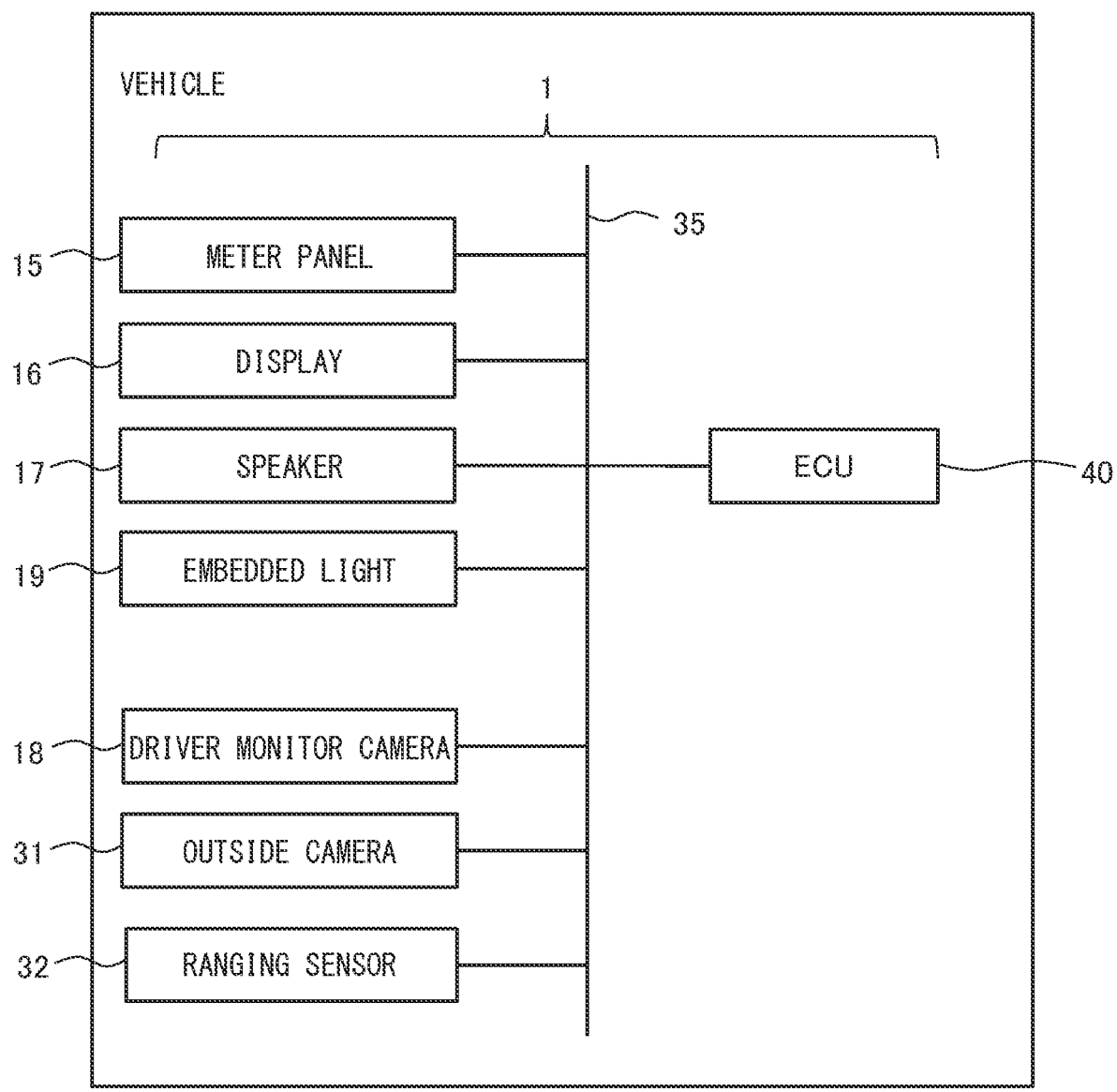
FIG. 2 is a diagram schematically illustrating a component configuration of the vehicle.

Next, a component configuration of the vehicle 1 will be described with reference to FIG. 2. FIG. 2 is a diagram schematically illustrating a component configuration of the vehicle 1.

As shown in FIG. 2, the vehicle 1 includes a meter panel 15, a display 16, a speaker 17, and an embedded light 19. In addition, the vehicle 1 includes a driver monitor camera 18, an outside camera 31, a ranging sensor 32, and an ECU 40.

The outside camera 31 is a device that captures an image of the surroundings of the vehicle. The outside camera 31 includes a two-dimensional detector (such as a CCD, C-MOS) configured by arrays of photoelectric transducers sensitive to visible light, and an imaging optical system that forms an image of an area to be captured on the two-dimensional detector. In the present embodiment, the outside camera 31 is mounted in the inside of the vehicle 1, for example, so as to face the front of the vehicle 1. The outside camera 31 captures an image of a front area of the vehicle 1 every predetermined capturing cycle (for example, 1/30 second to 1/10 second), and generates an image in which the front area is captured. Each time an image is generated, the outside camera 31 outputs the generated image to the ECU 40 via the in-vehicle network 35. It should be noted that the outside camera 31 may be a monocular camera or a stereo camera. When a stereo camera is used as the outside camera 31, the outside camera 31 also functions as the ranging sensor 32. The vehicle 1 may be provided with a plurality of outside cameras having different capturing directions or different focal lengths.

The ranging sensor 32 is a sensor that measures a distance to an object present around the vehicle 1. In the present embodiment, the ranging sensor 32 can also measure the azimuth of an object present around the vehicle 1. The ranging sensor 32 is, for example, a radar such as a millimeter-wave radar, a LiDAR, or a sonar. In the present embodiment, the ranging sensor 32 measures a distance to an object present in front of the vehicle. The ranging sensor 32 outputs the measured distance to the surrounding object to the ECU 40 at predetermined intervals via the in-vehicle network 35.

Figure 3:
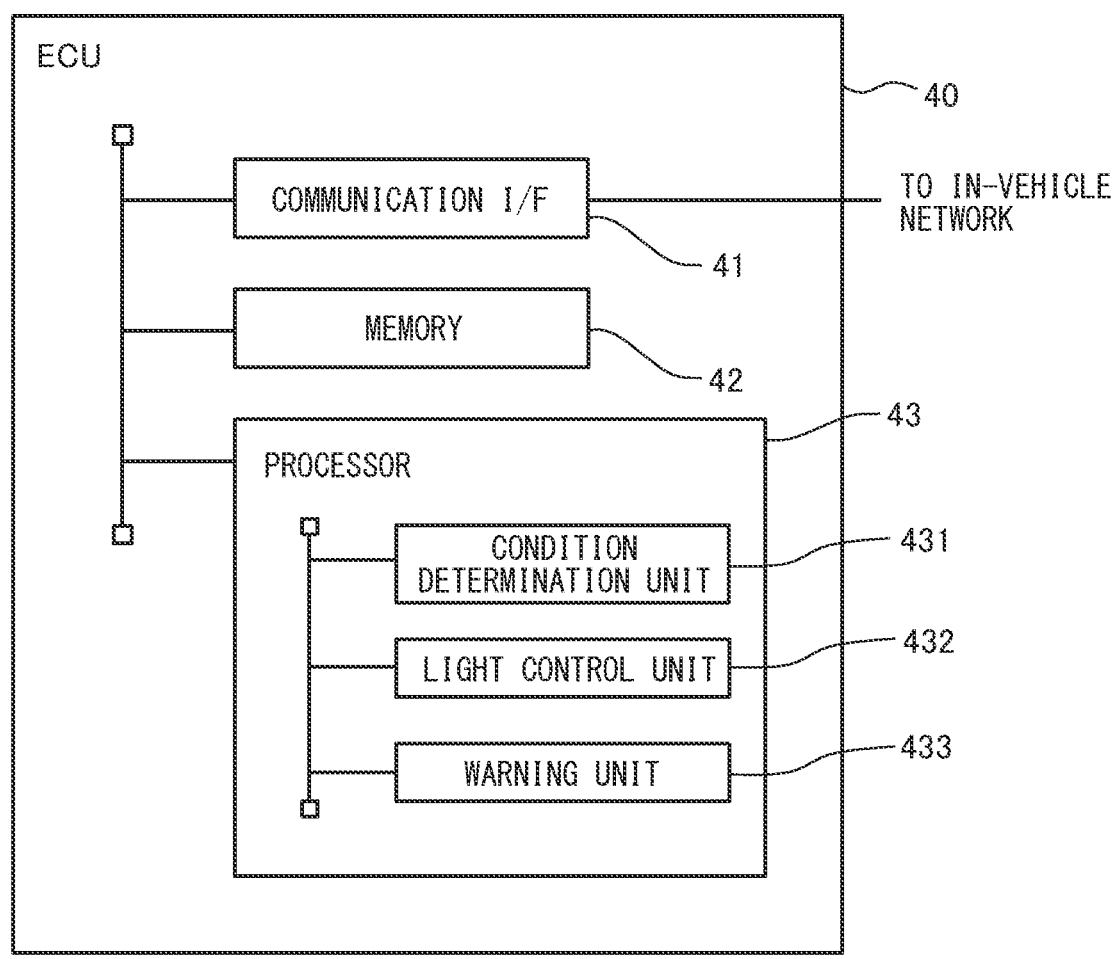
FIG. 3 is a configuration diagram of an ECU according to an embodiment.

The ECU 40 functions as a control device for controlling various in-vehicle devices of the vehicle 1 such as the embedded light 19. FIG. 3 is a configuration diagram of the ECU 40 according to an embodiment. As shown in FIG. 3, the ECU 40 includes a communication interface 41, a memory 42, and a processor 43. The communication interface 41 and the memory 42 are connected to the processor 43 via signal lines. In this embodiment, the vehicles 1 are provided with only one ECU 40, but may be provided with a plurality of ECUs divided for each function.

The communication interface 41 has interface circuitry for connecting the ECU 40 to an in-vehicle network 35 compliant with standards such as CAN (Controller Area Network). The ECU 40 communicates with other in-vehicle devices via the communication interface 41. Therefore, data of the image of the driver captured by the driver monitor camera 18, data of the image around the vehicle 1 captured by the outside camera 31, and data of the distance to the object present around the vehicle 1 detected by the ranging sensor 32 are inputted into the ECU 40 through the in-vehicle network 35 and the communication interface 41.

The memory 42 functions as a storage unit that stores data. The memory 42 includes, for example, a volatile semiconductor memory (for example, a RAM) and a non-volatile semiconductor memory (for example, a ROM). The memory 42 stores a computer program for executing various kinds of processing in the processor 43, various kinds of data used when various kinds of processing are executed by the processor 43, and the like.

The processor 43 includes one or more CPU (Central Processing Unit) and its peripheral circuitry. The processor 43 may further include GPU (Graphics Processing Unit) or arithmetic circuitry, such as a logical or numerical unit. The processor 43 executes various kinds of processing based on a computer program stored in the memory 42.

As illustrated in FIG. 3, in the present embodiment, the processor 43 includes a condition determination unit 431, a light control unit 432, and a warning unit 433. The condition determination unit 431 determines whether or not a forward facing condition that the driver should face forward is satisfied. The light control unit 432 controls, when it is determined that the forward facing condition is satisfied, the embedded light 19 so that the light moves toward the position ahead of the driver on the inner surface of the vehicle 1. These units included in the processor 43 are, for example, functional modules realized by a computer program running on the processor 43. Alternatively, these units included in the processor 43 may be realized by a dedicated arithmetic circuit provided in the processor 43.

Operation of Driving Assistance Device

Next, the operation of the driving assistance device of the vehicle 1 configured as described above will be described. The driving assistance device according to the present embodiment assists driving of a driver of the vehicle 1. In particular, in the driving assistance device of the present embodiment, the embedded light 19 is controlled so that the light moves toward the position ahead of the driver on the inner surface of the vehicle 1 so that the driver faces forward, when the forward facing condition that the driver should face forward is satisfied. In particular, in the present embodiment, when it is determined that the forward facing condition is satisfied and the driver is not facing forward, the embedded light 19 is controlled so that the light moves toward the position ahead of the driver on the inner surface of the vehicle 1.

Further, in the present embodiment, the forward facing condition is satisfied when at least one of the following is detected: the preceding vehicle of the vehicle 1 has started, the traffic light in front of the vehicle has switched from the stop indication to the passage permission indication, and the driver is looking aside.

Figure 4:
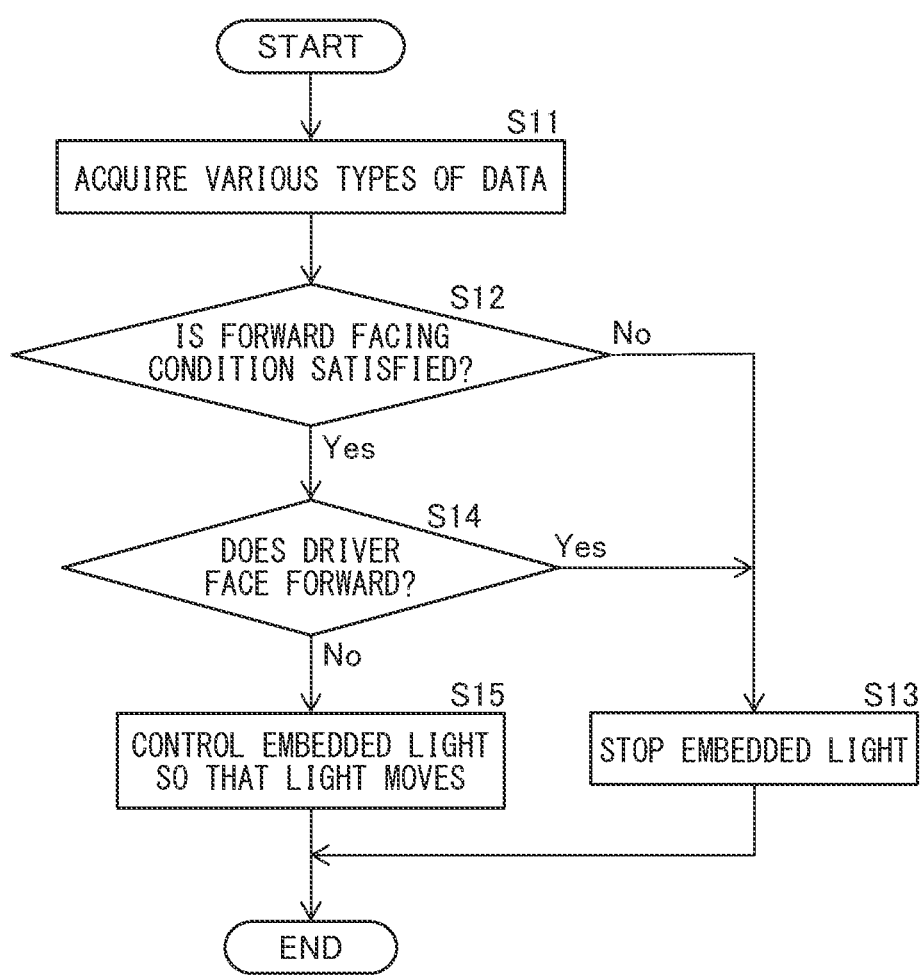
FIG. 4 is a diagram illustrating a flow of a driving assistance process.

FIG. 4 is a flowchart illustrating a flow of the driving assistance process. The illustrated driving assistance process is executed by the ECU 40 at regular intervals.

As illustrated in FIG. 4, the condition determination unit 431 of the ECU 40 first acquires various types of data from various types of detecting devices of the vehicle 1 (step S11). Specifically, in the present embodiment, the condition determination unit 431 of the ECU 40 acquires data of the image of the driver captured by the driver monitor camera 18, data of the image around the vehicle 1 captured by the outside camera 31, and data of the distance to the object present around the vehicle 1 detected by the ranging sensor 32.

Next, the condition determination unit 431 of the ECU 40 determines whether or not the forward facing condition that the driver should face forward is satisfied, based on the data acquired in the step S11 (step S12). In the present embodiment, the condition determination unit 431 of the ECU 40 determines whether or not the preceding vehicle of the vehicle 1 has started, whether or not the traffic light in front of the vehicle 1 has switched from the stop indication to the passage permission indication, and whether or not the driver is looking aside. It should be noted that the forward facing condition in which the driver should face forward may include other conditions, such as a closed railroad crossing being opened.

For example, the condition determination unit 431 of the ECU 40 determines whether or not the preceding vehicle has started on the basis of data of images of the periphery of the vehicle 1 captured by the outside camera 31 and data of the distance to an object present around the vehicle 1 detected by the ranging sensor 32. Specifically, the condition determination unit 431 of the ECU 40 recognizes the preceding vehicle immediately ahead of the vehicle 1 by image-processing based on the data of the outside camera 31, and detects the relative distance or the relative speed with the recognized preceding vehicle based on the data of the ranging sensor 32. Then, the condition determination unit 431 of the ECU 40 determines that the preceding vehicle of the vehicle 1 has started when the vehicle 1 is stopped, based on a vehicle speed sensor (not shown) and the relative distance between the vehicle 1 and the preceding vehicle is increased, or when the relative speed between the vehicle 1 and the preceding vehicle is equal to or higher than a predetermined speed.

In addition, the condition determination unit 431 of the ECU 40 determines whether or not a traffic light in front of the vehicle 1 has been switched from a stop indication (for example, a red signal) to a passage permission indication (for example, a blue signal) based on, for example, data of images of the surroundings of the vehicle 1 captured by the outside camera 31. Specifically, the condition determination unit 431 of the ECU 40 recognizes the traffic light in front of the vehicle 1 and the indication thereof by image-processing based on the data of the outside camera 31, and determines whether or not the indication has been switched from the stop indication to the passage permission indication based on the indication of the recognized traffic light.

Further, the condition determination unit 431 of the ECU 40 determines whether or not the driver is looking aside based on, for example, images of the driver captured by the driver monitor camera 18. Specifically, the condition determination unit 432 of the ECU 40 detects the direction of the driver's face or the direction of the driver's eye by the image process based on the image of the driver captured by the driver monitor camera 18. Then, the condition determination unit 431 of the ECU 40 determines that the driver is looking aside when the detected direction of the driver's face or eyes is forward of the driver.

If it is determined in step S12 that the forward facing condition is not satisfied, the light control unit 432 of the ECU 40 stops the operation of the embedded light 19 (step S13). Therefore, the embedded light 19 is not emitted. When the embedded light 19 is used as an ambient light for illuminating the inside of the vehicle at night, the light control unit 432 of the ECU 40 may control the embedded light 19 to emit light even when the forward facing condition is not satisfied. However, in this case, the embedded light 19 is not controlled to move the light toward the position in front of the driver, and emits light with a certain uniform brightness over the entire embedded light 19, for example.

On the other hand, when it is determined in the step S12 that the forward facing condition is satisfied, the condition determination unit 431 of the ECU 40 determines whether or not the driver faces forward based on, for example, images of the driver captured by the driver monitor camera 18 (step S14). Specifically, the condition determination unit 431 of the ECU 40 detects the direction of the driver's face or the direction of the driver's eye by the image process, based on the image of the driver captured by the driver monitor camera 18. Then, the condition determination unit 431 of the ECU 40 determines that the driver is facing forward when the detected direction of the driver's face or eyes is forward of the driver. When it is determined in step S14 that the driver is facing forward, the light control unit 432 of the ECU 40 stops the operation of the embedded light 19 (step S13).

Figure 5:
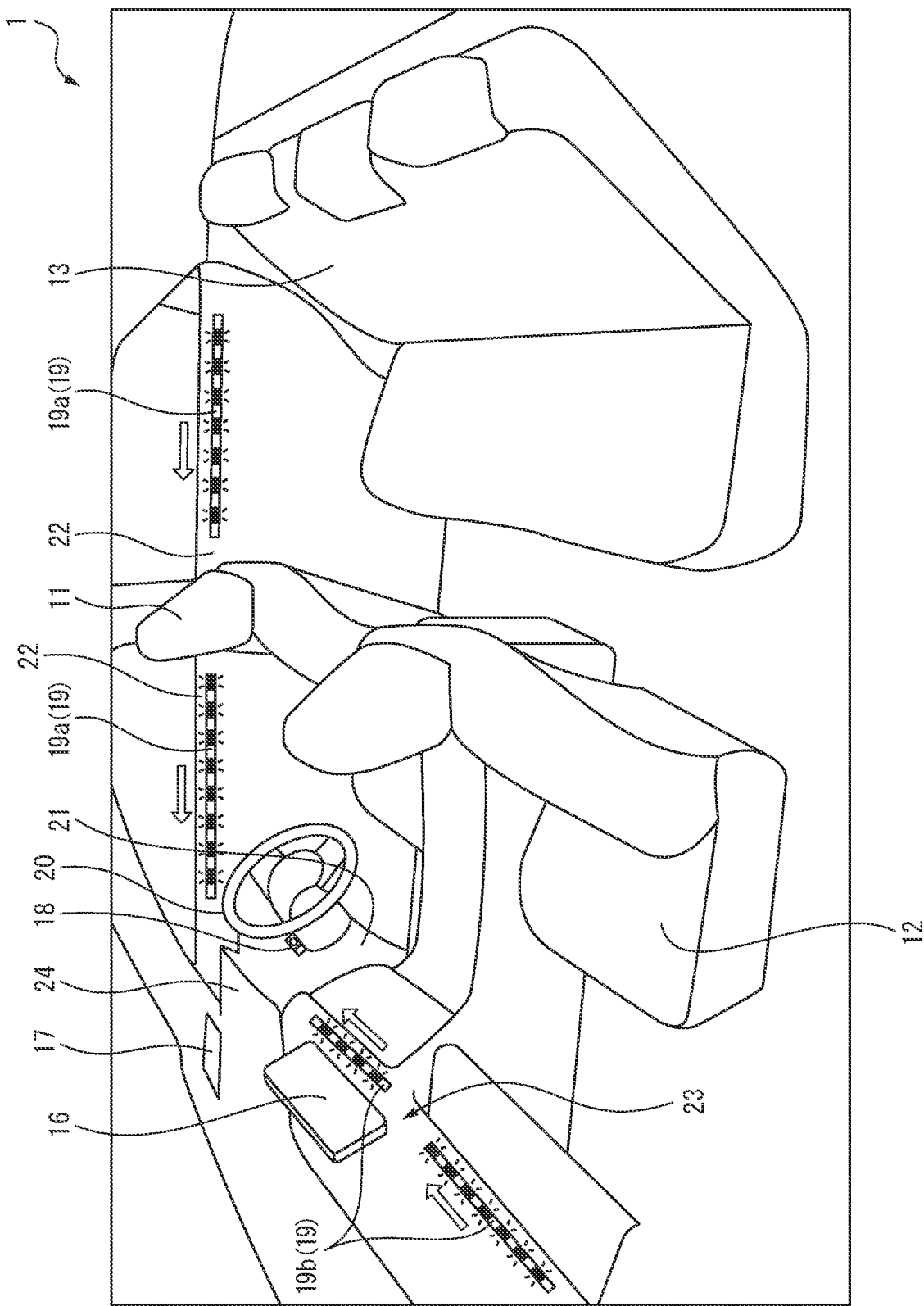
FIG. 5 is a view, similar to FIG. 1, schematically showing the interior of the vehicle when the embedded lights are controlled to move lights toward a forward position of a driver.

On the other hand, when it is determined in the step S14 that the driver does not face forward, the light control unit 432 of the ECU 40 controls the embedded light 19 so that the light moves toward the position in front of the driver (step S15). FIG. 5 is a view, similar to FIG. 1, schematically showing the interior of the vehicle 1 when the embedded light 19 is controlled so that the light moves towards a position in front of the driver. As shown in FIG. 5, in the first embedded light 19a extending in the front-rear direction of the vehicle 1 on the side surface of the interior of the vehicle 1, the adjacent lights of the first embedded light 19a are sequentially emitted so that the plurality of illuminated light parts move from the rear of the vehicle 1 toward the front. On the other hand, in the second embedded light 19b extending in the left-right direction of the vehicle 1 on the front surface of the interior of the vehicle 1, the light adjacent to the second embedded light 19b is sequentially emitted so that the plurality of illuminated light parts move from the passenger seat 12 side toward the driver's seat 11 side.

Effect and Modification

According to the above embodiment, when the forward facing condition that the driver should face forward is satisfied, the embedded light 19 is controlled so that the light moves toward the position ahead of the driver on the inner surface of the vehicle 1. Pursuit eye movement causes the driver to follow the moving light with the eyes, so that when the light moves toward the position in front of the driver, the driver naturally faces forward. Further, since the notification sound is not output, it is possible to reduce the possibility of the driver feeling discomfort. Further, in the present embodiment, since the embedded light 19 is provided on the side surface and the front surface of the interior of the vehicle 1, the driver is easily noticed. Therefore, according to the present embodiment, a new method of prompting the driver to face forward is provided.

In the above embodiment, the embedded light 19 embedded in an inner surface of the interior of the vehicle 1 is used as an in-vehicle light device that illuminates the inner surface of the interior of the vehicle 1. However, as long as the inner surface of the interior of the vehicle 1 can be partially illuminated, a device other than the embedded light 19 may be used as the in-vehicle light device.

Specifically, as the in-vehicle light device, for example, an irradiation light that illuminates the interior surface of the interior of the vehicle 1 may be used. The irradiation light is, for example, provided on the ceiling of the vehicle 1, and irradiates a laser beam to a position where the embedded light 19 is provided in the above embodiment to partially illuminate the inner surface of the interior of the vehicle 1. When the irradiation light is used, it is not necessary to embed the light in the interior of the vehicle 1, and thus the manufacturing cost is reduced.

Further, in the above embodiment, when it is determined that the forward facing condition is satisfied and the driver is not directed forward, the embedded light 19 is controlled so that the light moves toward the position ahead of the driver on the inner surface of the vehicle 1. However, if the forward facing condition is satisfied, the embedded light 19 may be controlled so that the light moves on the inner surface of the vehicle 1 toward the position ahead of the driver, regardless of whether the driver is facing forward.

Second Embodiment

Next, a driving assistance device according to a second embodiment will be described with reference to FIG. 6. The configuration and control of the driving assistance device according to the second embodiment are basically the same as the configuration and control of the driving assistance device according to the first embodiment. Therefore, a portion different from the driving assistance device according to the first embodiment will be mainly described below.

In the first embodiment, when it is determined that the forward facing condition is satisfied and the driver is not facing forward, the embedded light 19 is controlled so that the light moves. However, the movement of the light in the embedded light 19 may not be noticed by the driver. Therefore, in the present embodiment, when it is determined that the driver does not face forward after controlling the embedded light 19 so that the light moves toward the position ahead of the driver on the inner surface of the vehicle 1, a warning is displayed on the display device (the meter panel 15 or the display 16) of the vehicle 1, or a sound indicating a warning is output.

Figure 6:
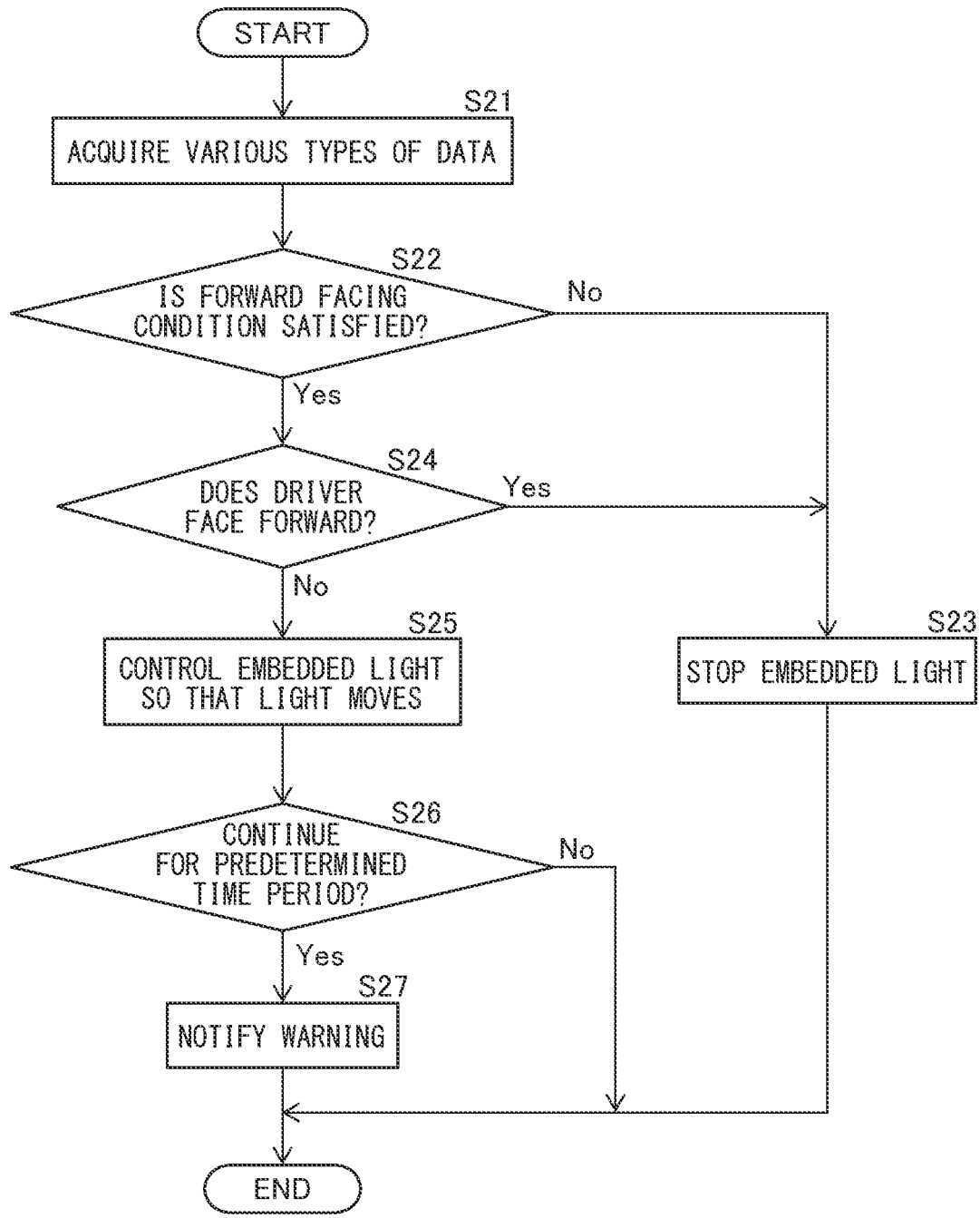
FIG. 6 is a flowchart illustrating a flow of a driving assistance process according to a second embodiment.

FIG. 6 is a flowchart illustrating a flow of a driving assistance process according to the second embodiment. The illustrated driving assistance process is executed by the ECU 40 at regular intervals. It should be noted that the steps S21-S25 in FIG. 6 is the same as the steps S11-S15 in FIG. 4, and therefore explanation thereof will be omitted.

When the embedded light 19 is controlled so that the light moves toward the position ahead of the driver in the step S25, the condition determination unit 431 of the ECU 40 determines whether the control of the embedded light 19 continues for a predetermined period of time (step S26). The predetermined time is, for example, a predetermined fixed time of several seconds to several tens of seconds. If it is determined in the step S26 that the control of the embedded light 19 is not continued for a predetermined period, the control of the embedded lights 19 is continued as it is.

On the other hand, if it is determined in the step S26 that the control of the embedded light 19 continues for a predetermined period, the warning unit 433 of the ECU 40 notifies the drivers of the warning (step S27). Specifically, the warning unit 433 of the ECU 40 causes the meter panel 15 or the display 16 to display a warning prompting the driver to face forward. In addition, in the present embodiment, the warning unit 433 of the ECU 40 causes the speaker 17 to output a sound representing a warning that prompts the driver to face forward.

According to the present embodiment, a warning display is output to the display device or a warning sound is output only when the driver does not move forward even if the embedded light 19 is controlled so that the light moves. Therefore, it is possible to make the driver face forward more reliably while minimizing discomfort on the part of the driver.

While embodiments according to the present disclosure have been described above, the present disclosure is not limited to these embodiments, and various modifications and changes can be made within the scope of the claims.

The invention claimed is:

1. A driving assistance device for assisting driving of a driver of a vehicle, comprising:
   an in-vehicle light device for illuminating an inner surface of an interior of the vehicle; and,
   a control device for controlling the in-vehicle light device, wherein:
   the in-vehicle light device includes a first embedded light provided on a side surface of an interior of the vehicle and a second embedded light provided on a front surface of the interior of the vehicle, and
   the control device is configured to determine whether or not a forward facing condition in which the driver should face forward is satisfied; and control the first embedded light and the second embedded light so that light moves on the side and front surfaces of the vehicle toward a position ahead of the driver when it is determined that the forward facing condition is satisfied.

2. The driving assistance device according to claim 1, wherein the control device is configured, when it is determined that the forward facing condition is satisfied, to control the in-vehicle light device such that light moves from a rear side of the vehicle toward a front side of the vehicle on an inner surface of a side surface of the interior of the vehicle.

3. The driving assistance device according to claim 1, wherein the control device is configured, when it is determined that the forward facing condition is satisfied and the driver is not directed forward, to control the in-vehicle light device so that light moves toward the position ahead of the driver on the inner surface of the vehicle.

4. The driving assistance device according to claim 3, wherein the control device is configured to cause a warning to be displayed on a display device of the vehicle or a sound representing a warning to be output, when it is determined that the driver is not directed forward, after controlling the in-vehicle light device so that light moves toward a position ahead of the driver on the inner surface of the vehicle.

5. The driving assistance device according to claim 1, wherein the forward facing condition is satisfied when at least one of a starting of a preceding vehicle of the vehicle, a switching of a traffic signal in front of the vehicle from a stop indication to a passage permission indication, and inattentiveness of the driver is detected.

\* \* \* \* \*